United States Patent
Baccile et al.

(10) Patent No.: US 8,415,403 B2
(45) Date of Patent: Apr. 9, 2013

(54) MESOPOROUS MATERIALS AND REACTANTS FOR PREPARING THEM

(75) Inventors: Niki Baccile, Paris (FR); Martin In, Grabels (FR); Corine In-Gerardin, Grabels (FR); Francis Luck, Noisy le Grand (FR); Julien Reboul, Castries (FR); Sander Van Donk, Uccle-Belgique (NL)

(73) Assignees: Total Raffinage Marketing, Puteaux (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 12/747,797

(22) PCT Filed: Dec. 11, 2008

(86) PCT No.: PCT/FR2008/052282
§ 371 (c)(1),
(2), (4) Date: Sep. 29, 2010

(87) PCT Pub. No.: WO2009/081000
PCT Pub. Date: Jul. 2, 2009

(65) Prior Publication Data
US 2011/0028576 A1    Feb. 3, 2011

(30) Foreign Application Priority Data
Dec. 14, 2007 (FR) ..................... 07 08727
Dec. 21, 2007 (FR) ..................... 07 09011

(51) Int. Cl.
*C08J 9/28* (2006.01)

(52) U.S. Cl.
USPC ........... 521/61; 521/63; 521/64; 521/110; 521/111; 521/154

(58) Field of Classification Search .......... 521/61, 521/63, 64, 110, 11, 154
See application file for complete search history.

(56) References Cited

U.S. PATENT DOCUMENTS
2004/0267038 A1  12/2004  Tatsumi et al.
2006/0030477 A1*  2/2006  Chaumonnot et al. .......... 502/64

FOREIGN PATENT DOCUMENTS
EP    1627853 A1    2/2006

OTHER PUBLICATIONS

Atanu Mitra, et al., "Synthesis and characterization of mesoporous titanium dioxide using self-assembly of sodium dodecyl sulfate and benzyl alcohol systems as templates," Microporous and Mesoporous Materials, 2008, pp. 66-72, vol. 109, No. 1-3, Elsevier Science Publishing, New York, US.

Wen-Hua Zhang, et al., "Pore size design of ordered mesoporous silicas by controlling micellar properties of triblock copolymer $EO_{20}PO_{70}EO_{20}$," Microporous and Mesoporous Materials, 2006, pp. 179-185, vol. 89, No. 1-3, Elsevier Science Publishing, New York, US.

International Search Report for International Application No. PCT/FR2008/052282, dated May 27, 2009.

* cited by examiner

*Primary Examiner* — Irina S Zemel
(74) *Attorney, Agent, or Firm* — Sughrue Mion, PLLC

(57) ABSTRACT

The invention relates to a process for manufacturing porous materials, which comprises the following steps: preparation of a solution of at least one structuring agent, having at least two structuring parts linked by at least one type of reversible non-covalent interaction; formation of the structured or porous material; separation of the at least two parts of the structuring agent at low temperature; and recovery of at least 50% by weight of the two non-degraded structuring parts and the porous material.

13 Claims, 2 Drawing Sheets

MESOPOROUS MATERIALS AND REACTANTS FOR PREPARING THEM

CROSS REFERENCE TO RELATED APPLICATIONS

This application is a National Stage of International Application No. PCT/FR2008/052282, filed Dec. 11, 2008, claiming priority from French Patent Application Nos. 0708727 and 0709011, filed Dec. 14, 2007 and Dec. 21, 2007, respectively, the contents of all of which are incorporated herein by reference in their entirety.

The present invention relates to the field of porous, in particular mesoporous materials, to their use, notably in the field of molecular sieves or catalysis, in particular in the petrochemical field, and to reactants for preparing these materials.

Inorganic porous materials are widely used, notably as a catalyst or catalyst supports in many industrial applications. These materials have a large specific surface area and may have an amorphous, para-crystalline or crystalline structure. Amorphous materials, such as silica gel or alumina, do not possess long-range crystallographic order, while paracrystalline solids such as gamma or eta alumina are semi-ordered, thus showing wide X-ray diffraction peaks. These two classes of material generally have a wide pore distribution, for the most part in the size range extending from 1 to 100 nm, and more precisely within the range of mesopores, from 2 to 50 nm.

There is always an increasing need for improving catalytic efficiency. This improvement may proceed through the development of materials having greater accessible specific areas and greater pore volumes. In the 1990s, mesoporous silica materials were discovered, called M41S, having a uniform pore size adjustable within the range 1.3 to 10 nm. By varying the synthesis conditions, materials of this type have been described with morphologies that are hexagonal (MCM-41), cubic (MCM-48) or in layers.

Contrary to microporous materials that are generally synthesized by structuring around isolated molecules, M41S materials are generated around assemblies of molecules. The first structures were obtained by using micelles of surfactant molecules having an alkyl chain and a cationic polar head. These materials had a limited wall thickness, extending from 0.8 to 1.2 nm, and low thermal stability.

A great advance has been provided by the use of surfactants of the amine, diamine or inorganic oxide type, which have made it possible to obtain a greater thickness for the walls of this structure, in this way improving the stability of structured mesoporous materials. Another major development has been the use of amphiphilic sequenced copolymers of the PEO-PPO-PEO type that have enabled the size of the mesopores to be increased to approximately 30 nm.

However, in spite of the large degree of progress over the last few years in terms of synthesis, characterization and understanding of the mechanisms by which structured mesoporous materials are formed, industrial applications are still limited, notably by the cost of these materials.

When these materials are synthesized, the structuring agent may be trapped inside the pores. In order to remove the structuring agent from the pores, the material is generally calcined at a high temperature, which decomposes the structuring agent into small components that may be extracted from the pores. Calcination may produce negative effects such as deterioration of the structure of the material and salting-out of effluents that may cause environmental problems or high energy consumption.

It is thus desirable to have a method that can be carried out under mild conditions, notably which avoids a step of heating at a high temperature, which enables at least part of the structuring agent to be re-used during other syntheses, which can be carried out with low-cost solvents, for example in water, and/or which makes it possible to control at least some of the properties of the material obtained, such as pore size, structure or thermal resistance.

In addition, it is not always easy to obtain materials having the desired chemical properties, notably in terms of pore size, resistance or structure. The materials may be costly, difficult to prepare and require conditions generating large quantities of degraded reactants.

A need therefore exists for materials that have particular chemical properties, which are cheap and are easy to produce and which have an environmentally friendly synthesis.

According to one feature, the object of the present invention is a method for producing a porous, notably mesoporous material, comprising steps of:
  preparing a solution, in particular an aqueous solution of at least one structuring agent having at least two structuring parts assembled by at least one non-covalent reversible type of interaction,
  forming the structured or porous material,
  disassembling the at least two parts of the structuring agent at a low temperature,
  recovering at least 50% by weight of the two non-degraded structuring parts and the porous material.

A brief description of the figures:
  FIG. 1 describes the principle of the invention schematically,
  FIG. 2 is a graph representing the absorbed volume of mesoporous material,
  FIG. 3 is a graph representing the absorbed volume of mesoporous material,
  FIG. 4 represents the IR adsorption spectra of various materials, and
  FIG. 5 shows transmission electron microscopy (TEM) images and small angle X-ray diffusion curves of the materials.

Quite particularly, the structuring agent comprises identical structuring parts. According to another variant, the structuring agent comprises different structuring parts, and in particular two, three, four or even five different types.

The structuring parts may be water-soluble hydrophilic polymers. Among hydrophilic polymers, mention may be made of double hydrophilic block copolymers, double hydrophilic graft copolymers, triblock copolymers, comb polymers, graft polymers, statistical copolymers, terpolymers and homopolymers.

The structuring parts may include at least two, notably two, components that are water soluble, of which:
  at least one, notably one, component may be made insoluble in water under the effect of the addition of an inductor and/or under the effect of a variation in a physico-chemical parameter, and
  at least one, notably one, component remains water-soluble and which will enable the colloid to be stabilized.

The water-soluble non-reactive component may be neutral (uncharged). In this case it may consist of a polymeric segment of the polyethylene oxide type.

The reactive component, which may become insoluble in water under the effect of the addition of an inductor and/or under the effect of a variation in a physico-chemical parameter, may be neutral or negatively or positively charged.

The component made insoluble may of course be made soluble once again either in a reversible manner or by varying the same parameter or by another means, such as another physico-chemical parameter.

"Soluble in water" is understood, within the meaning of the present invention, as solubility in water at ambient temperature, this being greater than or equal to 3 mg/ml, notably greater than or equal to 6 mg/ml, and in particular greater than or equal to 8 mg/ml.

"Insoluble in water" is understood, within the meaning of the present invention, as solubility in water at ambient temperature and under conditions making the component insoluble, in particular a solubility less than or equal to 8 mg/ml, notably less than or equal to 6 mg/ml, and in particular less than or equal to 3 mg/ml.

"Polymer" is understood, within the meaning of the present invention, as a body composed of at least one repeating unit, notably repeating at least ten times, in particular at least twenty times, or even at least fifty times, and more particularly at least a hundred times.

In particular, the structuring parts are linked by at least one type of interaction, notably chosen from hydrogen bonds, electrostatic bonds, coordination bonds, dipolar bonds, solvation and hydrophobic interactions.

The method may make it possible to recover at least 70%, notably at least 75%, in particular at least 80% or even 85%, more particularly 90% and even more particularly 95% by weight, of the two structuring parts.

The solution comprising the two structuring parts recovered from a previous synthesis may notably be re-used just as it is for a new synthesis.

The structuring agent may be in the form of colloids, and in particular colloids of which the mean size and/or diameter extends from 1 nm to 10 micrometers, notably 1 nm to 2 micrometers.

"Colloids" are understood, within the meaning of the present invention, to be particles of which the size is greater than the molecules of which they are composed (supramolecular size) but sufficiently small so that the mixture remains homogeneous. In particular, their size extends from 1 nanometer ($10^{-9}$ m) to ten micrometers (that is $10^{-5}$ m). Colloids may also be called micelles or micellar aggregates.

Formation of the structuring agent by structuring parts may notably be induced by adding at least one inductor and the inductor may be a chemical component and/or a physical component. The inductor may make it possible to modify at least one physico-chemical parameter, notably a "chemical" parameter such as a variation in pH, ionic strength and/or a "physical" parameter such as temperature change.

The inductor may be an ion, such as protons or hydroxide ions when the pH is varied, a charged or neutral molecule, a charged or neutral polymer, a copolymer, or a block or statistical, grafted or comb copolymer.

The inductor may have an opposite charge to the reactive component of the structuring part.

For example, complexing between the inductor and the reactive component of the structuring part may enable colloids to be obtained. In the event, these are structuring agents for the materials.

When a component of the structuring part is thermosensitive, temperature variation may be used to make this component insoluble in water and then to lead to the formation of a colloid. A thermosensitive component of the structuring part may be poly(N-isopropylacrylamide) (PNIPAAm) or polyvinylethers.

Quite particularly, the structuring agent is formed in solution, in particular in aqueous solution.

Advantageously, the method is carried out at a low temperature, that is to say a temperature less than or equal to 200° C., notably at a temperature below 100° C., and in particular at ambient temperature.

The method may make it possible to obtain the material at autogenic pressures of solutions, notably aqueous solutions, brought to 200° C., but the method is generally carried out at atmospheric pressure.

According to another of the invention's features, its object is the use of at least one compound having at least two structuring parts assembled by means of at least one non-covalent reversible type of interaction as a recyclable structuring agent in the preparation of a porous material, notably at ambient temperature.

The mesoporous material may be formed from precursors of silica, alumina, silica-alumina, zirconia, titania, such as for example silicon tetraethoxide (TEOS), aluminum alkoxides, or titanium or zirconium alkoxides or salts. The material may also be formed from preformed inorganic nanoparticles.

More particularly, the method employs structuring parts and the precursor of the mesoporous material in a weight ratio (structuring part/total mass of precursor material) extending from 0.20 to 0.65, notably from 0.30 to 0.55.

In addition, this method may also make it possible to create mesoporosities in zeolite and/or zeotypes. This would create intra-crystalline secondary porosities of structured mesopores existing next to the micropores of the zeolite.

Known methods for obtaining materials comprising at the same time micropores and mesopores may require heating to a high temperature that may generate defects in the structure of the material and/or asymmetrical pores.

The method according the invention may make it possible to create mesoporosity without affecting the initial microporosity, in terms of composition and/or in terms of structure.

FIG. 1 describes a particular embodiment of the method wherein the structuring agent, a hydrophilic polymer, is formed by assembling and micellization in water of structuring parts, assembling being induced notably by modifying a physico-chemical parameter (step a), the structuring agent is then formed by inorganic polycondensation (step b), the structuring agent is then disassembled and released by modification that is the reverse of that of step a) of a physico-chemical parameter (step c) and the structuring parts are recovered and may then be re-used.

FIGS. 2 and 3 are nitrogen adsorption-desorption isotherms prepared for characterizing the porous materials. The gas used for performing these measurements is nitrogen. These figures show the partial pressures ($P/P_0$) of nitrogen as abscissae and the volumes adsorbed (in cm$^3$/g) in the material as ordinates.

Figure 1:
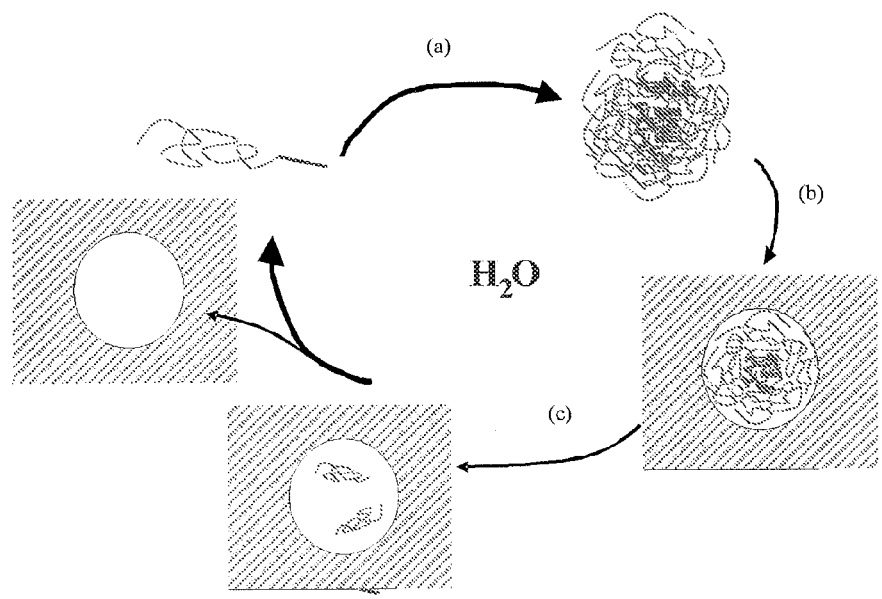

According to one variant, the method may include a step in which zeolite crystals are assembled on the structuring agent. This may thus create a mesoporous material with walls of crystalline zeolite.

According to another variant, the structuring agent creates mesopores during synthesis of the zeolite. The structuring agent is then introduced during synthesis of the zeolite.

According to yet another of its features, the object of the invention is also the use of reversible micelles, making it possible to prepare mesoporous materials. The micelles may include or consist of the compounds described above.

According to one feature, the object of the invention is also a mesoporous material obtained by the method described above.

According to a particular variant, the mesoporous material also has micropores. In such materials, the presence of intracrystalline mesopores on zeolite catalysts may make it possible to improve the accessibility and transport of reactants and products inside the zeolite crystal, while the micropores of the zeolite induce properties whereby preferred forms are selected.

The mesoporous material may include or consist of silica, titanium oxide, alumina, metallic oxides or mixed compounds comprising these various compositions.

According to yet another of the features of the invention, its object is the use of a mesoporous material as a molecular sieve or a catalyst, notably for chemical reactions, and in particular in the petrochemical field.

EXAMPLES

Mesostructures were verified by X-ray diffraction on a Bruker D8 diffractometer and by SAXS. The SAXS measurement was carried out in a configuration using a rotating copper anode (4 kW) as the source of rays with an "Osmic" focusing multilayer monochromator giving a high flux ($10^8$ photons/sec) and point collimation was employed. A 2D image plate detector was used.

The TEM images were obtained on a JEOL 1200 EX II microscope from microtomed samples.

$N_2$ adsorption/desorption measurements were taken with a Micromeretics ASAP 2010.

Example 1A

Synthesis of a Structured Material

The polymethacrylic diblock polymer (PMA)-b-polyethylene oxide (PEO) ($M_{PEO}$=5000 g/mol; $M_{PMA}$=2100 g/mol from Polymer Source Inc.) (88 mg) and oligochitosane lactate (weight of polymers approximately 5000 g/mol of polymer; Aldrich) (80 mg) were added to water (9.5 g), and the pH was 4.3 and the temperature 25° C. TEOS (Aldrich) (0.319 ml) was then added and mixed with the whole. An emulsion formed and the pH was brought to 2. After approximately 15 minutes with stirring, the TEOS had hydrolyzed and the pH was then brought to 5. A precipitate was obtained after approximately 20 minutes. The mixture was stirred at ambient temperature for 24 h.

A dispersion 1A was obtained. This dispersion 1A was filtered through a sinter, and a solution 1A was recovered on the one hand and a structured material 1A on the other.

Example 1B

Synthesis of a Structured Material

The polymethacrylic diblock polymer (PMA)-b-polyethylene oxide (PEO) ($M_{PEO}$=5000 g/mol; $M_{PMA}$=2100 g/mol from Polymer Source Inc.) (88 mg) and a polyethyleneimine polymer (PEI) of formula —($CH_2$—$CH_2$—NH)n- ($M_{PEI}$=700 g/mol, from Aldrich) (in a molar ratio PEI NH/PMAbPEO COOH equal to 1) were added to water (9.5 g). TEOS (Aldrich) (0.319 ml) was then added and mixed with the whole. The pH was brought to 2 and the pH was then adjusted to 4. A precipitate was obtained after approximately 20 minutes. The mixture was stirred at ambient temperature for 24 h.

A dispersion 1B was obtained. This dispersion 1B was filtered through a sinter, and a solution 1B was recovered on one hand and a structured material 1B on the other.

Example 1C

Synthesis of a Structured Material

A variant of the method of example 1B, carried out with polyethyleneimine, consisted of carrying out the same procedure as in example 1B but bringing the temperature to 80° C. after adjusting the pH. This variant led to the dispersion 1C and then, after filtration and separation of the solid, to the solution 1C and the structured material 1C.

Comparative Example 2A

Synthesis of a Porous Material by Calcination

The structured material 1A underwent calcinations according to the following outline to give the mesoporous materials 2A respectively.

The powders were calcined by a method in two steps in which:
the first gradient lasted 6 hours and went from ambient temperature (25° C.) to 200° C. at a rate of 3° C./min, and
the second gradient lasted 6 hours and went from a temperature of 200° C. to 620° C. at a rate of 3° C./min.

The powders were allowed to return to ambient temperature and gave the mesoporous materials 2A.

Figure 2:
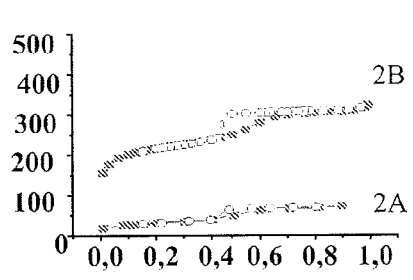

FIG. 2 shows the adsorption-desorption isotherms prepared for characterizing the mesoporous material 2A.

Comparative Example 2B

Synthesis of a Porous Material by Calcination

The structured material 1B underwent calcinations according to the following outline to give respectively the mesoporous materials 2B.

The powders were calcined by a method in two steps in which:
the first gradient lasted 6 hours and went from ambient temperature (25° C.) to 200° C. at a rate of 3° C./min, and
the second gradient lasted 6 hours and went from a temperature of 200° C. to 620° C. at a rate of 3° C./min.

The powders were allowed to return to ambient temperature and gave the mesoporous materials 2B.

FIG. 2 shows the adsorption-desorption isotherms prepared for characterizing the mesoporous material 2B.

Comparative Example 2C

Synthesis of a Porous Material by Calcination

The structured material 1C underwent calcinations according to the following outline to give the mesoporous materials 2C respectively.

The powders were calcined by a method in two steps in which:
the first gradient lasted 6 hours and went from ambient temperature (25° C.) to 200° C. at a rate of 3° C./min, and
the second gradient lasted 6 hours and went from a temperature of 200° C. to 620° C. at a rate of 3° C./min.

The powders were allowed to return to ambient temperature and gave the mesoporous materials 2C.

Example 3A

Synthesis of a Porous Material According to the Invention ("Ex Situ Washing")

A dispersion 1A as described in example 1A was filtered. The powder 1A obtained was made into a dispersion 3A in water (the same volume as for dispersion 1) at a pH of 8 for 24 h, the dispersion 3A was then filtered through a sinter and the mesoporous material 3A was obtained on the one hand and then dried at 60° C. for 12 h and the solution (filtrate) 3A was recovered and could then be re-used.

Example 3B

Synthesis of a Porous Material According to the Invention ("Ex Situ Washing")

A dispersion 1B as described in example 1B was filtered. The powder 1 obtained was made into a dispersion 3B in water (the same volume as for dispersion 1) at a pH of 8, with stirring, for 24 h, the dispersion 3B was then filtered through a sinter and the mesoporous material 3 was obtained on the one hand and then dried at 60° C. for 12 h and the solution (filtrate) 3B was recovered and could then be re-used.

Figure 3:
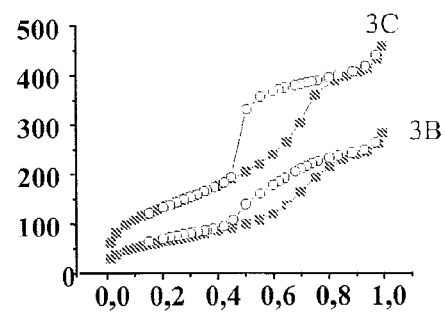

The mesoporous material 3B was characterized by its nitrogen adsorption/desorption isotherm in FIG. 3.

Example 3C

Synthesis of a Porous Material According to the Invention ("Ex Situ Washing")

A dispersion 1C as described in example 1C was filtered. The powder 1C obtained was made into a dispersion 3C in water (the same volume as for dispersion 1) at a pH of 8 for 24 h, the dispersion 3C was then filtered through a sinter and the mesoporous material 3C was obtained on the one hand and then dried at 60° C. for 12 h and the solution (filtrate) 3C was recovered and could then be re-used.

The mesoporous material 3C was characterized by its nitrogen adsorption/desorption isotherm in FIG. 3.

Example 4C

Synthesis of a Porous Material According to the Invention ("In Situ Washing")

A base (NaOH, 1 M) was added to a dispersion 1C as described in example 1C until a pH of 8 was obtained. The dispersion was stirred for 24 h and then filtered. On the one hand the filtrate corresponded to the mesoporous material 4C, this being dried at 60° C. for 12 h, and on the other hand the solution 4 (filtrate) was recovered and could be re-used.

The material 4C was characterized by X-ray diffusion and transmission electron microscopy. These two analyses showed that the material 4, obtained after washing, had an ordered mesostructure with a correlation distance of 1.34 nm.

Figure 4:
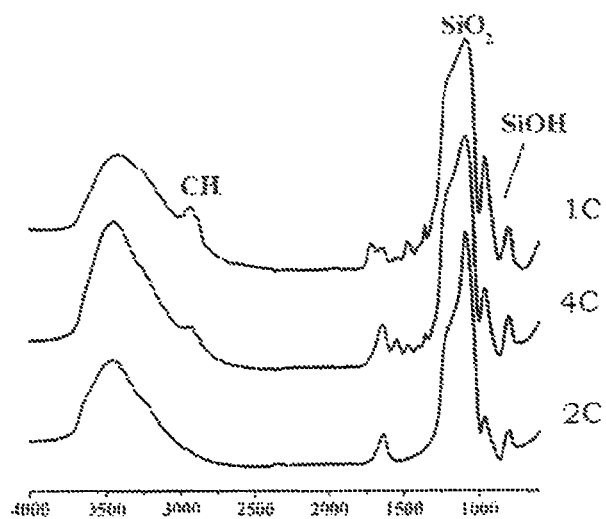
FIG. 4 is an IR spectrum of various compounds (with wavelengths in cm$^{-1}$ as abscissae).

FIG. 4 gives the IR spectra of the porous material 4C obtained by washing in situ, of the porous material 2C obtained by calcining and of the material 1C.

This IR spectrum made it possible to see that as regards the inorganic parts, there were no substantial differences between the various compounds presented. However, it was possible to observe that the silanol peaks at around 900 $cm^{-1}$ became smaller with washing at pH 8 and the $SiO_2$ peak became larger, perhaps due to condensation of silica.

In the case of calcinations, a reduction in the peaks at 950 and 800 $cm^{-1}$, concerning the $SiO_2$ peaks, could again be observed, which might have been caused by condensation between silanol groups.

The large OH peak in the 3500 $cm^{-1}$ region was without doubt due to the greater quantity of water in the washed materials, as the peak at 1640 $cm^{-1}$ led one to believe. The greater quantity of water was perhaps associated with the porosity created by washing at pH 8.

It could also be noted that the peak at 3000 $cm^{-1}$ fell in intensity which tended to show a reduction in, or even disappearance of, organic material in the washed compounds 4C and calcined compounds 2C.

Example 5C

Demonstration of Re-Use

The material 1C gave the mesoporous material 4C after in situ washing. The solution 4C, recovered after filtration and separation of the mesoporous material 4C, was re-used as it was for a new synthesis of the material. A synthetic procedure identical to that for the material 1C was then carried out, starting from the solution 4C (addition of TEOS, pH brought to 2 and then 5, mixed for 24 h at ambient temperature). A structured material 5C was then obtained. It was washed at pH 8 and the material 6C was obtained after filtration and separation.

Figure 5:
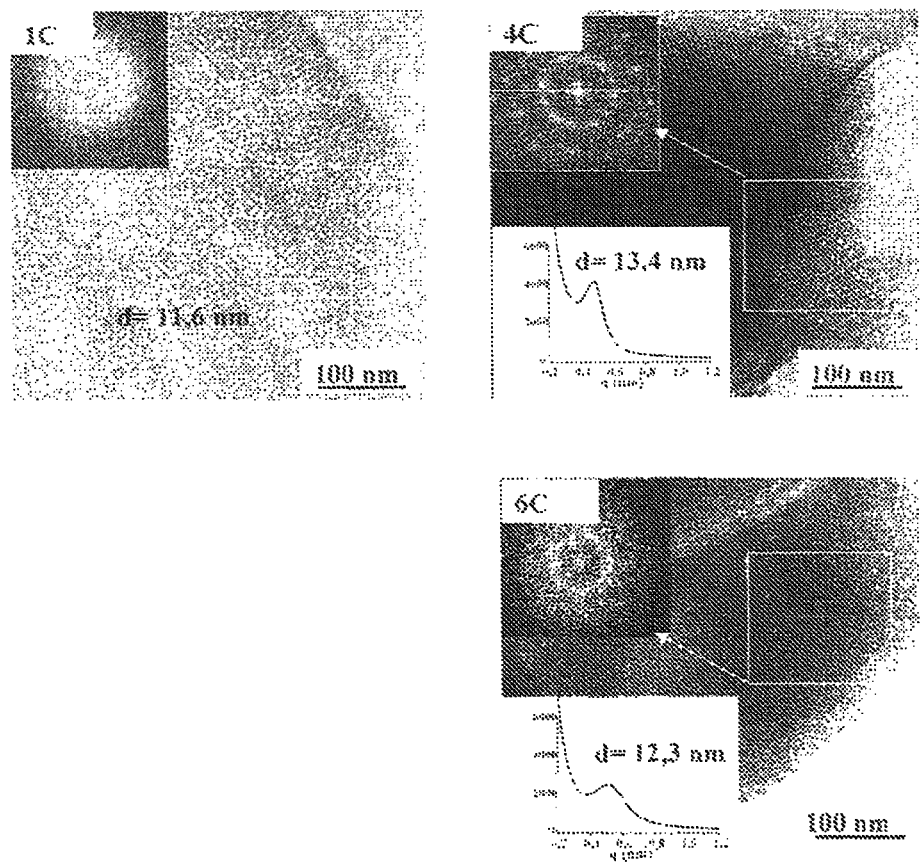
FIG. 5 shows transmission electron microscopy images (TEM) and small angle X-ray diffusion curves of compounds (with intensity as ordinates and wavelength in nm$^{-1}$ as abscissae).

The X-ray diffusion results presented in FIG. 5 show that the material 1C was mesostructured and that the porous material 4C was also mesostructured. After recycling the polymers, the new material formed 6C also had a structure on the mesoscopic scale. The correlation distance observed was 12.3 nm.

The invention claimed is:

1. A method for producing a porous material comprising steps of:
    (a) preparing a solution of at least one structuring agent having at least two structuring parts assembled by at least one non-covalent reversible type of interaction, and a precursor of a porous material,
    (b) forming a structured material of the precursor of the porous material around the structuring agent,
    (c) precipitating the structured material,
    (d) treating the precipitated structured material to disassemble the structuring agent from the structured material at a low temperature,
    (e) recovering at least 50% by weight of the structuring parts and the porous material,
        wherein the structuring parts are water-soluble hydrophilic polymers, chosen from double hydrophilic block copolymers, double hydrophilic graft copolymers, triblock copolymers, comb polymers, graft polymers, statistical copolymers, terpolymers and homopolymers.

2. The method as claimed in claim 1, wherein the at least two structuring parts are the same hydrophilic polymer.

3. The method as claimed in claim 1, wherein the structuring agent comprises different structuring parts.

4. The method as claimed in claim 1, wherein the structuring agent is in the form of colloids.

5. The method as claimed in claim 1, wherein the formation of the structuring agent by the structuring parts is induced by adding at least one inductor and the inductor may be a chemical component and/or a physical component.

6. The method as claimed in claim 1, wherein the structuring agent is formed in solution.

7. The method as claimed in claim 1, wherein the temperature is less than or equal to 200° C.

8. The method as claimed in claim 1, wherein the precursor of the porous material is a precursor of silica, a precursor of alumina, a precursor of silica-alumina, a precursor of zirconia, a precursor of titania, or salts thereof.

9. The method as claimed in claim 3, wherein the different structuring parts comprise 2-5 different hydrophilic polymers.

10. The method as claimed in claim 4, wherein the size of the colloids extends from $10^{-9}$ m to $10^{-5}$ m.

11. The method as claimed in claim 6, wherein the solution is an aqueous solution.

12. The method as claimed in claim 7, wherein the temperature is less than or equal to 100° C.

13. The method as claimed in claim 8, wherein the precursor of the porous material is silicon tetraethoxide (TEOS), an aluminum alkoxide, a titanium alkoxide, a zirconium alkoxide or a salt thereof.

* * * * *